United States Patent [19]

Klomp

[11] 4,119,064
[45] Oct. 10, 1978

[54] RICH CORE STRATIFIED CHARGE SPARK IGNITION ENGINE WITH PERIPHERAL EXHAUST PORT

[75] Inventor: Edward D. Klomp, Mount Clemens, Mich.

[73] Assignee: General Motors Corporation, Detroit, Mich.

[21] Appl. No.: 705,064

[22] Filed: Jul. 14, 1976

[51] Int. Cl.² ............................................. F02B 3/00
[52] U.S. Cl. ............................. 123/30 C; 123/32 B; 123/32 ST; 123/75 B
[58] Field of Search ............. 123/30 C, 30 D, 32 SP, 123/32 ST, 32 B, 75 B

[56] References Cited

U.S. PATENT DOCUMENTS

| Re. 25,578 | 5/1964 | Witzky | 123/32 ST |
|---|---|---|---|
| 1,866,703 | 7/1932 | Gehres | 123/30 C |
| 1,969,202 | 8/1934 | Bugaud | 123/30 C |
| 1,998,708 | 4/1935 | Campbell | 123/30 C |
| 2,469,448 | 5/1949 | Barber | 123/30 C |
| 2,483,288 | 9/1949 | Malin | 123/30 C |
| 2,484,009 | 10/1949 | Barber | 123/30 C |
| 2,882,873 | 4/1959 | Witzky | 123/32 ST |
| 3,094,974 | 6/1963 | Barber | 123/32 ST |
| 3,195,520 | 7/1965 | Simko | 123/32 ST |
| 3,255,739 | 6/1966 | Von Seggern et al. | 123/32 ST |
| 3,318,292 | 5/1967 | Hideg | 123/32 ST |
| 3,572,298 | 3/1971 | Onishi et al. | 123/32 ST |
| 3,703,886 | 11/1972 | Witzky | 123/32 ST |
| 3,898,965 | 8/1975 | Fischer | 123/32 SP |
| 3,926,158 | 12/1975 | Dolza, Sr. | 123/32 ST |
| 3,933,133 | 1/1976 | Sheklefon | 123/30 C |
| 3,976,038 | 8/1976 | Stahl | 123/32 ST |
| 3,980,059 | 9/1976 | Noguchi et al. | 123/32 ST |
| 4,014,300 | 3/1977 | Klomp | 123/32 ST |

FOREIGN PATENT DOCUMENTS 603,439   4/1960   Italy ........................................ 123/30 D Primary Examiner—Samuel W. Engle
Assistant Examiner—S. A. Cangialosi
Attorney, Agent, or Firm—Robert J. Outland

[57] ABSTRACT

Spark ignition internal combustion engine arrangements are disclosed wherein swirling stratified charges are formed in the engine combustion chambers, each charge having a central core of relatively fuel-rich mixture and a surrounding peripheral portion of leaner mixture or air, and in which the exhaust valve for each chamber is connected with the fuel-lean peripheral portion so that during the exhaust process the portions of the burned gases which are lowest in unburned hydrocarbons will be preferentially exhausted, leaving those portions richest in hydrocarbons as residual gases within the chamber.

9 Claims, 8 Drawing Figures

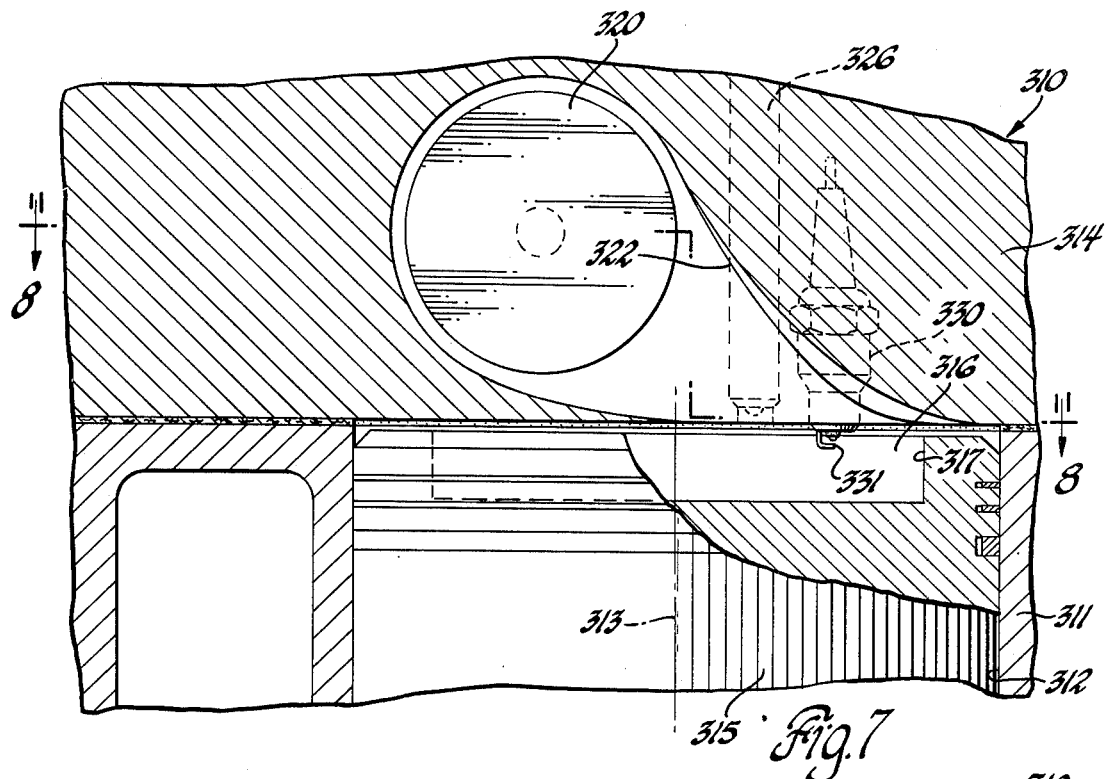
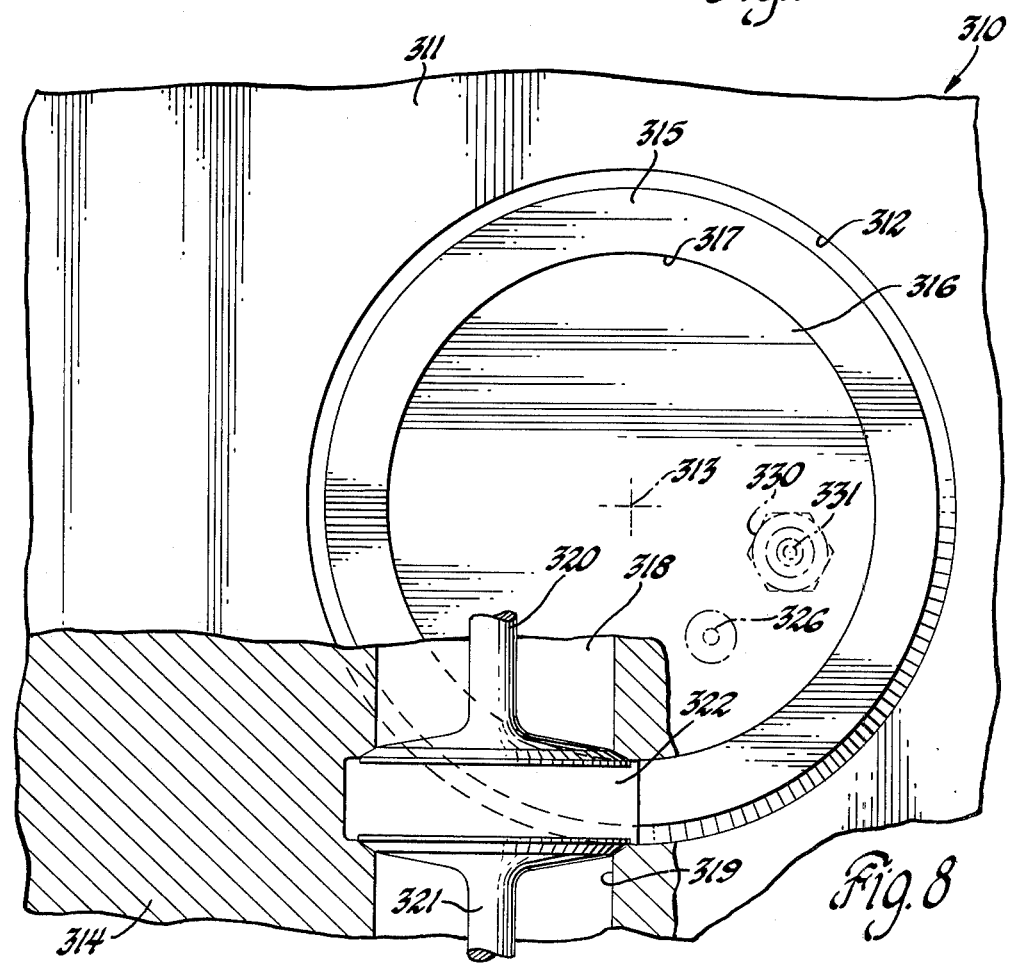

RICH CORE STRATIFIED CHARGE SPARK IGNITION ENGINE WITH PERIPHERAL EXHAUST PORT

This invention relates to internal combustion engines and, more particularly, to rich core startified charge spark ignition engines wherein air-fuel mixtures are formed with varying degrees of richness in diverse zones of the combustion chambers under at least certain engine operating conditions.

It is known in the art relating to spark ignition internal combustion engines to provide means for forming in the engine combustion chambers, air-fuel charges having a variation in mixture strength between various zones of the chambers. Many types of arrangements for such stratified charge or segregated charge engines have been proposed. Among these are what may be termed rich core stratified charge concepts in which each combustion chamber is provided with a swirling charge having a central core of relatively fuel-rich mixture and a surrounding peripheral portion composed primarily of air or leaner mixture. Examples of such arrangements are disclosed in my prior U.S. patent applications Ser. No. 548,683, filed Feb. 10, 1975 and now U.S. Pat. No. 4,018,193 and Ser. No. 636,748, filed Dec. 1, 1975 and now U.S. Pat. No. 4,014,300, both assigned to the assignee of the present invention.

The present invention relates to rich core stratified charge spark ignition engines of the general type disclosed in the above-mentioned U.S. patent applications and provides means applicable to such engines to preferentially discharge during the exhaust processes the peripheral portions of the burned cylinder gases which portions are lowest in unburned hydrocarbons and oxides of nitrogen ($NO_x$). A number of possible cylinder arrangements are provided which use the basic concept, and certain operating methods are suggested that may further reduce the exhaust of hydrocarbons and $NO_x$ from the cylinders.

In any stratified charge spark ingition engine, unburned hydrocarbons will result if flame quenching occurs near a wall or in a lead fringe area surrounding the richer mixture. It may be possible to reduce or virtually eliminate wall quenching when direct chamber fuel injection is utilized by properly controlling the interaction of the fuel spray and the directed gas motion to prevent any fuel molecules from reaching the wall. However, it does not appear to be possible to prevent the formation of a very lean fringe region surrounding the rich mixture. At sufficiently lean mixture ratios, a flame originating in the highly combustible richer mixture will be quenched, leaving residual unburned hydrocarbons. At low loads and in the absence of throttling, the unburned hydrocarbons will not be exposed to temperature levels sufficient to permit their reaction. Furthermore, additional unburned hydrocarbons will appear in the exhaust if the richer mixture is not quickly diluted with sufficient oxygen to permit a completed reaction prior to cooling of the cylinder charge during the expansion process to below the necessary reactive temperature levels.

In most, if not all, of the known stratification concepts, the air-fuel mixture is permitted to be in contact with at least a portion of the combustion chamber surface. Thus, in addition to fringe area quenching, there is wall quenching.

The present invention is based upon a recognition of the fact that in rich core stratified charge engine arrangements the residual hydrocarbons in the combustion chamber charge following combustion as well as the $NO_x$ resulting from combustion will be located primarily in the areas in and adjacent to the central portions of the combustion chamber to which the richer air-fuel mixture was provided or in which it was formed. Thus, this invention provides means for limiting the exhaust of unburned hydrocarbons and $NO_x$ from the chamber by locating the exhaust valve so that the peripheral portions of the chamber gases which are lowest in residual hydrocarbons and $NO_x$ will be preferentially exhausted first from the combustion chamber, leaving as a residual charge those portions of the gases which have the most residual hydrocarbons and $NO_x$ in them. This result is obtained by locating the valve controlled exhaust port to one side of the cylinder and connecting it with the peripheral portion of the combustion chamber, preferably in a manner to take advantage of the swirling motion of the charge to aid the exhaust process.

These and other features and advantages of the invention will be more fully understood from the following description of certain diverse embodiments chosen for purposes of illustration as representative of the way in which the invention may be applied and by reference to the accompanying drawings.

In the drawings:

FIGS. 1, 3, 5 and 7 are fragmentary cross-sectional views of various embodiments of internal combustion engines formed according to the invention and showing for one cylinder the arrangements of the intake and exhaust passages and certain features of the engine combustion chambers;

FIG. 8 is a view, partially in section, of the chamber and valve arrangements of the engine of FIG. 7 as viewed downwardly from the planes indicated by the line 8—8.

Figure 1:
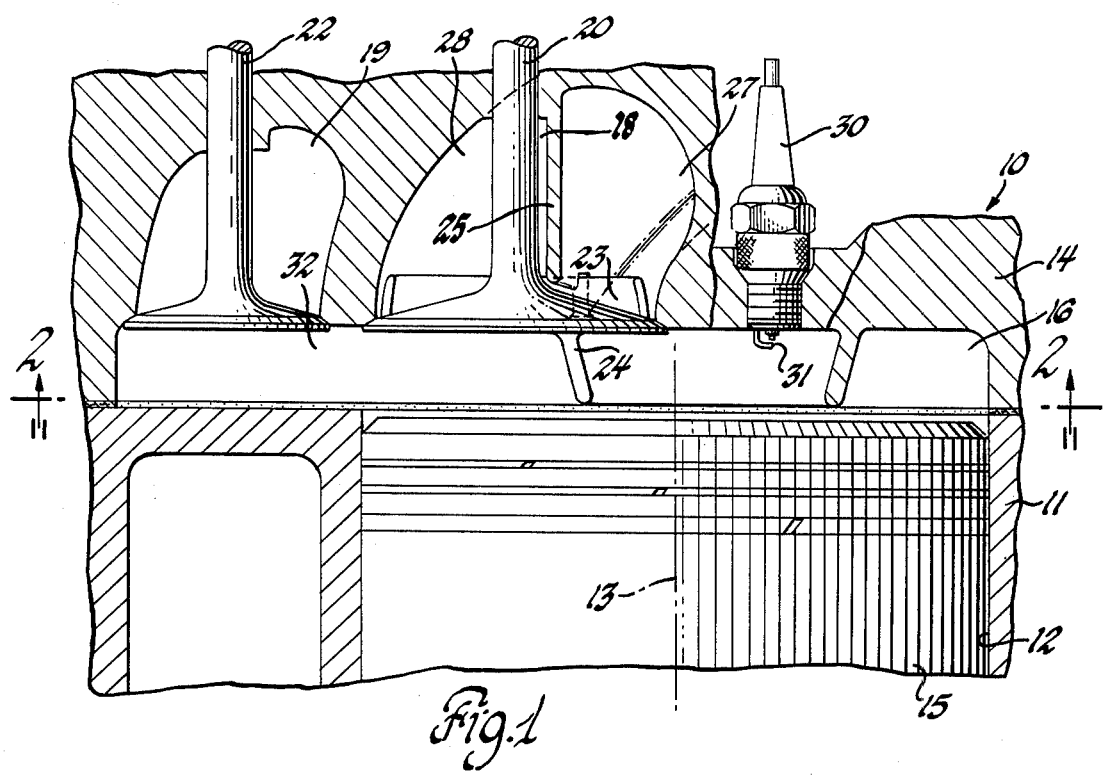
Figure 2:
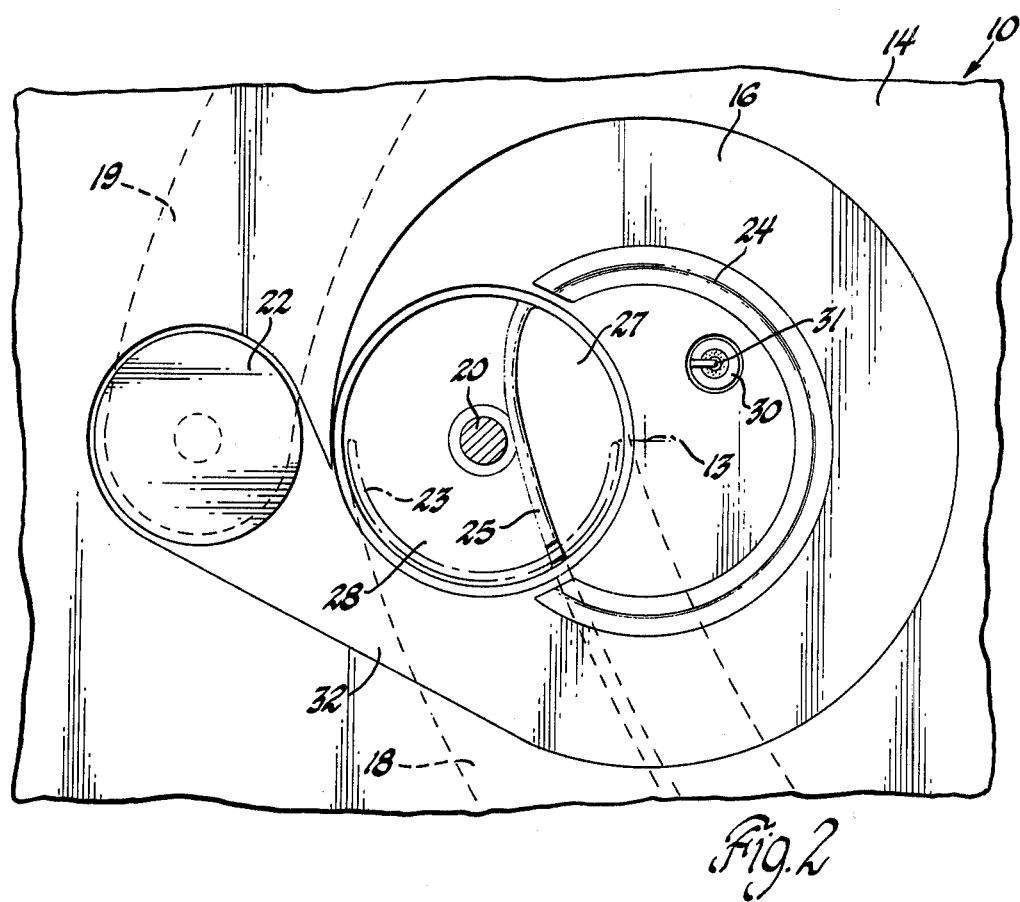
FIG. 2 is a view of the chamber arrangement of the engine of FIG. 1 as viewed upwardly from the plane indicated by the line 2—2.

Referring now particularly to the embodiment of FIGS. 1 and 2 of the drawings, there is shown a spark ignition internal combustion engine generally indicated by numeral 10. Engine 10 has a cylinder block 11 which defines internally thereof a plurality of cylinders 12, having central axes 13 and only one of which is illustrated. A cylinder head 14 is mounted on the cylinder block, closing the ends of the cylinders in conventional manner. Each of the cylinders has a piston 15 reciprocably disposed therein which cooperates with the cylinder head and cylinder wall to define a combustion chamber 16 at the closed end of its respective cylinder.

The engine cylinder head 14 is provided with intake and exhaust ports 18 and 19, respectively, which are connected with their respective combustion chamber 16 to provide for the admission of air to and the exhaust of gases from the combustion chambers. The ports 18, 19 are respectively provided with intake and exhaust poppet valves 20, 22 which are adapted to control the opening and closing of the ports in conventional manner.

The intake port 18 and valve 20 are so positioned and formed as to direct incoming air or air-fuel charges into the combustion chamber 16 in a circular or vortex pattern which moves clockwise around the axis of the cylinder as viewed in FIG. 2. The intake valve 20 may be provided with a shroud 23 that blocks a part of the port opening and aids in directing the inlet gas flow in the clockwise vortical pattern.

The cylinder head is also provided with a curved flow directing vane or mixture scoop 24 which extends downwardly from the lower surface of the cylinder head and arcuately around the cylinder axis in a curve generally parallel to the cylinder walls and intermediate these walls and the axis of the cylinder. The vane is continuous, except for the portion of the combustion chamber end wall occupied by the intake port and valve. In cross-section, as shown in FIG. 1, the vane is preferably slanted slightly inwardly toward the center of the cylinder and extends downwardly close to the piston at the top of its travel to divide the combustion chamber into a central zone or core portion and an outer edge or peripheral portion in which two separate portions of the cylinder charge may be segregated.

The inlet port 18 is provided with a divider wall 25 which separates the port longitudinally into first and second flow passages 27, 28. The wall 25 terminates adjacent the inlet valve 20 and its end is generally aligned with the adjacent end of the combustion chamber vane 24 so that flow passage 27 empties into the core portion of the combustion chamber inside the vane, while flow passage 28 empties into the peripheral portion of the combustion chamber outside vane 24. Passage 27 is preferably connected with a carburetor or other means, not shown, for supplying a relatively rich air-fuel mixture to the passage for delivery to the central core portion of the combustion chamber and the passage 28 is preferably connected with a source of air or leaner air-fuel mixture for delivery to the peripheral portion of the combustion chamber.

A spark plug 30 is mounted in the cylinder head with electrode means 31, forming a spark gap within the core portion of the combustion chamber, in position to ignite the richer mixture delivered thereto through the inlet passage 27.

In contrast to more conventional forms of cylinder and combustion chamber arrangements, the exhaust port 19 and its associated exhaust valve 22 are located at one side of the main combustion chamber and outside the periphery of the portions of the combustion chamber wall defined by the cylinder. Exhaust port 19 is connected with the combustion chamber by a connecting exhaust passage 32 which extends from the combustion chamber in a tangential direction at a point just before the location of the intake port as defined by the direction of cylinder swirl. In this manner, the passage 32 is adapted to peel off, or receive in a preferential manner, combustion chamber gases swirling in the chamber around the periphery thereof and before they reach the location of the intake port.

Thus, in operation of the embodiment of FIGS. 1 and 2, the intake stroke of the piston draws a charge of air or lean mixture from intake passage 28 into the peripheral portion of the combustion chamber outside vane 24, while a charge of relatively fuel-rich mixture is delivered from passage 27 into the central core portion of the combustion chamber inside vane 24. The direction of the port 18 and the shroud 23 on the inlet valve 20 direct the incoming charge in a vertical swirling motion clockwise around the combustion chamber as shown in FIG. 2.

As the piston moves upwardly on the compression stroke, the charge is compressed, with the vane 24 helping to segregate the richer and leaner mixtures, the richer mixture being ignited by firing the spark plug near the end of the compression stroke.

The burning of the richer mixture in the central core portion of the chamber increases the combustion chamber temperature sufficiently to also burn leaner mixtures existing in a peripheral portion of the chamber, with mixing of the two charges taking place during combustion. Nevertheless, initial maintenance of the richer mixture portion in the central portion of the chamber tends to segregate within the central portion $NO_x$ resulting from combustion and unburned hydrocarbons that may result from wall quenching or quenching between the richer and leaner mixtures in the portions of the combustion chamber away from the outer edge of the peripheral portion.

Following the expansion stroke, the exhaust valve is opened and the gases in the cylinder are exhausted, the passage 32 acting to preferentially select from the swirling gases those at the outer periphery of the combustion chamber first. Thus, at the conclusion of the exhaust stroke, the residual gases remaining in the combustion chamber consist primarily of those portions of the charge formed from the richer mixture in the central core portion of the chamber and containing the maximum percentages of unburned quench hydrocarbons and $NO_x$. In this way these portions of the charge are retained in the combustion chamber for reburning on the subsequent cycle.

It is conventional in internal combustion engines that some overlap is provided between the opening of the intake port and the closing of the exhaust port and, to the extent this occurs, the present arrangement has the further advantage that goes temporarily drawn from the cylinder into the intake passges will be taken primarily from the central hydrocarbon richer portions of the exhaust gases while the exhaust passage is still receiving exhaust gases from the peripheral hydrocarbon leaner portions of the chamber. It may even be desirable to increase the valve overlap above that usually utilized in order to retain for burning in the chamber a greater percentage of the hydrocarbon rich portions of the burned gases.

Figure 3:
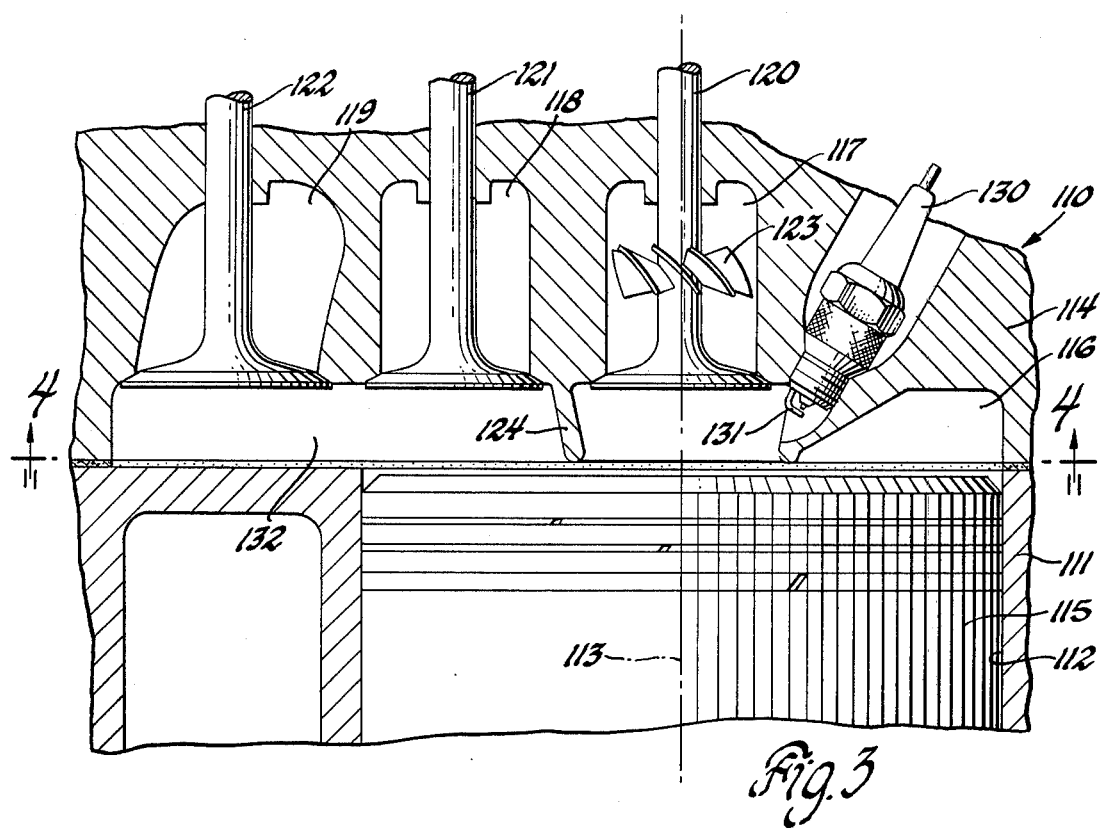
Figure 4:
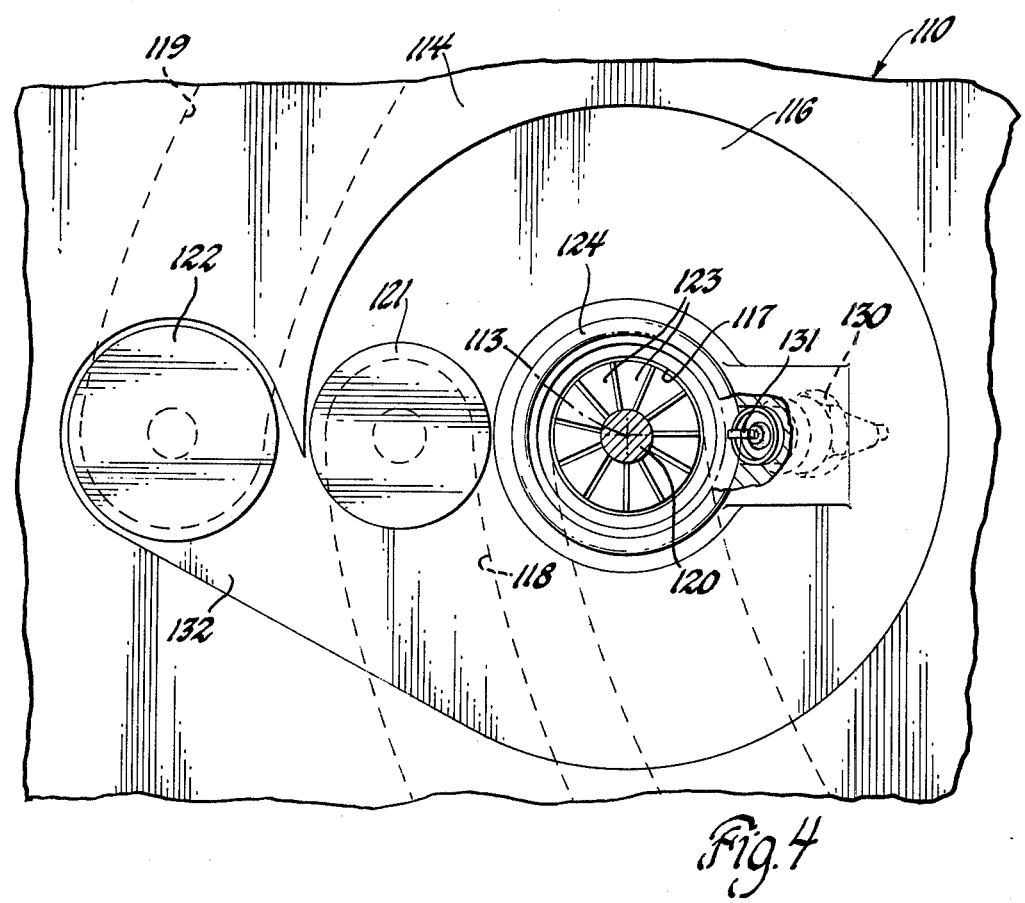
FIG. 4 is a view of the chamber arrangement of the engine of FIG. 3 as viewed upwardly from the plane indicated by the line 4—4.

Referring now to the embodiment of FIGS. 3 and 4 wherein the reference numerals are in the 100 series, there is shown an internal combustion engine generally indicated by numeral 110 and having many features of similarity with the first described embodiment. Engine 110 has a cylinder block 111 defining a plurality of cylinders 112, each having an axis 113. The ends of the cylinders 112 are closed by a cylinder head 114, a reciprocable piston 115 being provided in each cylinder and defining with its cylinder and the cylinder head a combustion chamber 116 at the closed end of the cylinder.

The cylinder head 114 is provided at each cylinder location with a pair of intake ports, a central intake port 117 centered on the cylinder axis and peripheral intake port 118 located at one side of the chamber. In addition, an exhaust port 119 is provided at a location beyond the periphery of the cylinder wall defined portion of the combustion chamber and located in the manner of the exhaust port in the first described embodiment. The ports 117, 118, 119 are respectively controlled by intake valves 120 and 121 and exhaust valve 122.

Intake port 117 is preferably connected with a carburetor, or other means not shown, for supplying to the port a relatively rich air-fuel mixture. The port is further provided with swirl blades or vanes 123 which are secured within the port or may be attached to the valve 120 as shown and direct the incoming mixture in a swirling motion having a clockwise direction as viewed in FIG. 4. Intake port 118 is preferably connected with means not shown to supply air or a relatively lean air-fuel mixture to the peripheral portion of the combustion chamber, the port 118 being angled in a manner to direct the mixture in a swirling pattern clockwise as viewed in FIG. 4 around the combustion chamber periphery.

A flow directing vane or scoop 124 extends angularly around the cylinder axis, surrounding the central intake port 117 and separating the central core portion of the combustion chamber from the peripheral portion into which intake port 118 opens. The form of vane 124 is much like that of the vane in the first described embodiment, except that vane 124 is continuous and departs only slightly from its preferred cross section at the location of the spark plug 130, which is mounted in the cylinder head and has electrodes 131 extending into the central core portion of the chamber in a position to ignite the richer mixture delivered thereto.

The exhaust passage 119 connects with the peripheral portions of the combustion chamber 116 by a tangentially connecting exhaust passage 132 formed in much the same manner as the comparable passage of the first described embodiment.

The operation of the embodiment of FIGS. 3 and 4 is similar to that of the first described embodiment, except for the admission of the richer and leaner mixtures through the separate intake passages 117, 118 and the more positive isolation or separation of the two mixture charges by the continuous vane 124. Otherwise, the admission, combustion and exhaust events occur in much the same manner as previously described, and further discussion is not believed necessary.

Figure 5:
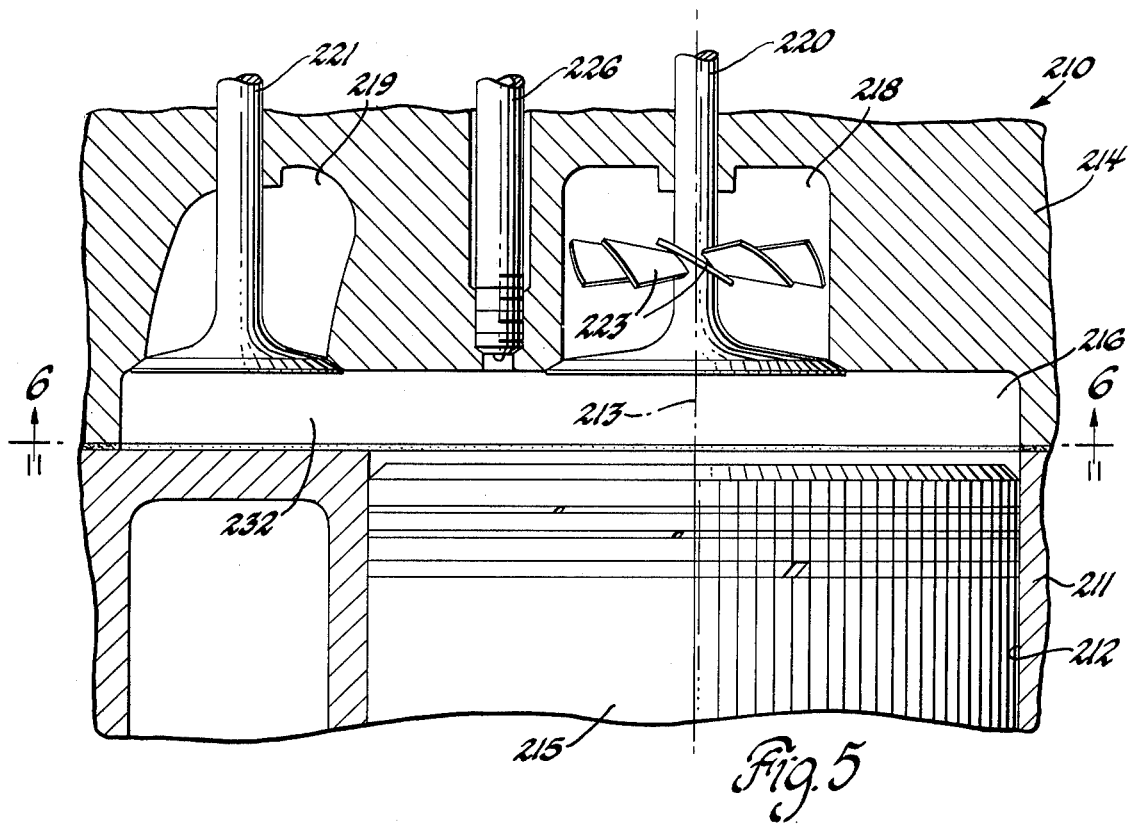
Figure 6:
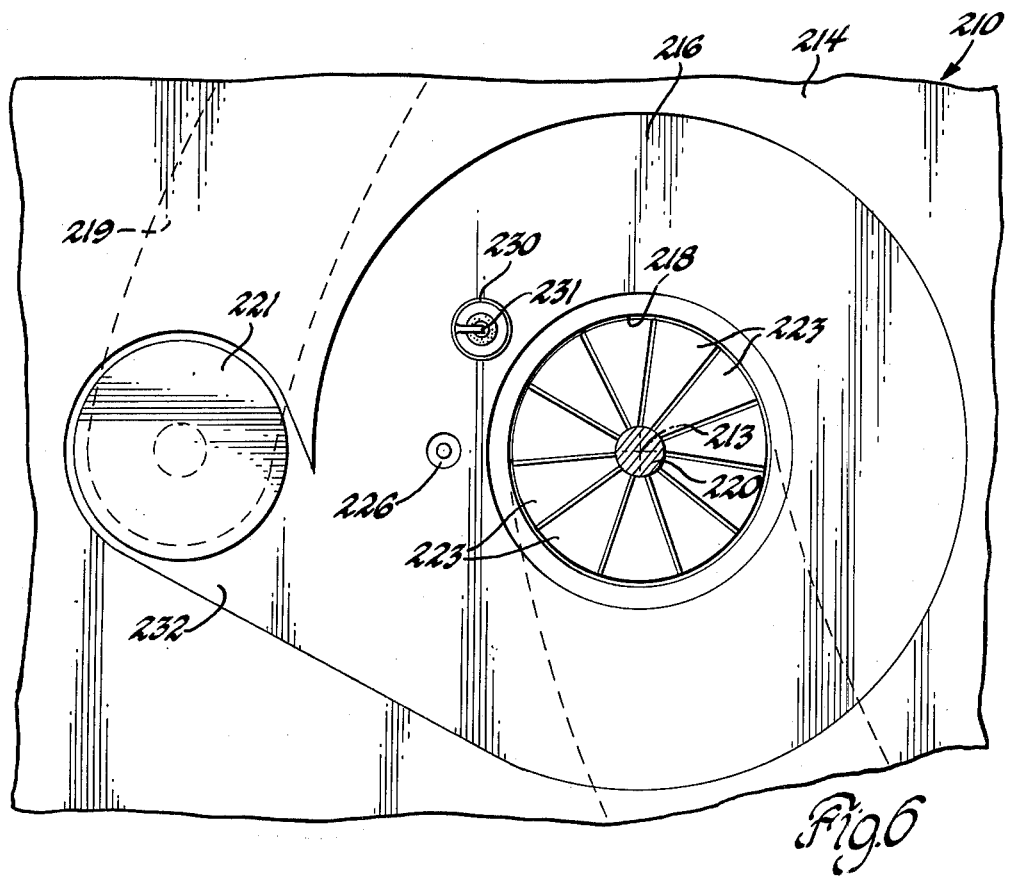
FIG. 6 is a view of the chamber arrangement of the engine of FIG. 5 as viewed upwardly from the plane indicated by the line 6—6.

Referring now to the embodiment of FIGS. 5 and 6 in which the reference numerals are in the 200 series, there is shown an internal combustion engine generally indicated by numeral 210 and having a cylinder block 211 with cylinders 212 that have axes 213 and are closed by a cylinder head 214. Pistons 215 within the cylinders form combustion chambers 216 at the closed ends of the cylinders.

Cylinder head 214 is provided at each cylinder location with an intake port 218 located on the central axis of the cylinder and an exhaust port 219 disposed outside the perihery of the cylinder wall defined portion of the combustion chamber and in the manner of the embodiments previously described. An intake valve 220 and an exhaust valve 221 are provided to control the flow of gases through their respective ports. The intake port 218 is connected with a source, not shown, of air and is provided with swirl blades or vanes 223 which may be secured in the port or fixed to the intake valve as shown. Vanes 223 are arranged to direct the incoming air in a clockwise swirling pattern around the combustion chamber as viewed in FIG. 6.

Instead of using carbureted mixtures and divider vanes to form a stratified or segregated mixture pattern in the combustion chamber as is done in the first described embodiments, the embodiment of FIGS. 5 and 6 relies upon use of a fuel injector 226 located near the edge of the inlet valve 220 and adapted to spray fuel into the swirling air stream in a manner to form a relatively rich air-fuel mixture in the central core portion of the cylinder, leaving the peripheral portion with air or a relatively lean air-fuel mixture. A spark plug 230 is also provided having its electrodes 231 in the combustion chamber at a point near valve 220 and the fuel injector 226, but displaced slightly from the fuel injector in the direction of swirl of the air charge in the cylinder so as to permit igniting of the fuel in the mixture shortly after its injection.

The exhaust port 219 connects with the peripheral portions of the combustion chamber 216 by a tangentially connecting exhaust passage 232 formed in the same manner as the exhaust passages of the previously described embodiments and operating in the same manner to preferentially select and exhaust gases from the outer periphery of the swirling charge.

The operation of the embodiment of FIGS. 5 and 6 is much like that of the previously described embodiments, with the differences being in the formation of the swirling stratified charge of mixture having a rich core which is accomplished in the manner described above.

Referring now to the embodiment of FIGS. 7 and 8 in which the reference numerals are in the 300 series, there is shown an internal combustion engine generally indicated by numeral 310 and having a cylinder block 311 defining a plurality of cylinders 312 having central axes 313 and closed at their outer ends by a cylinder head 314. Each cylinder is provided with a reciprocating piston 315 which defines a combustion chamber 316 at the closed end of its respective cylinder and within an enlarged recess 317 provided in the piston.

Cylinder head 314 is provided with an intake port 318 and an exhaust port 319 controlled by intake and exhaust valves 320 and 321, respectively. Ports 318 and 319 open in opposition to one another to a connecting passage 322 which extends angularly downwardly from the port ends to open to the combustion chamber along its periphery adjacent and outside of the recessed portion 317 of the piston. The angular arrangement of passage 322 is such as to direct incoming air from the port 318 into the combustion chamber in a swirling pattern having a counterclockwise direction of motion as viewed in FIG. 8.

The cylinder head 314 is also provided with a fuel injector 326 arranged to form a stratified relatively rich charge of air-fuel mixture in the central core portion of the cylinder and a spark plug 330 having electrodes 331 disposed in position to ignite the rich mixture charge near the end of the engine compression stroke.

In operation, the intake stroke of the piston draws a charge of air from the intake port 318 into the combustion chamber, the angular direction of the connecting passage 322 causing the air to pass in a swirling pattern around the chamber 316. Near the end of the compression stroke, fuel is injected by injector 326 to form a relatively rich mixture in the central core portion of the chamber which is ignited by the spark plug 330.

Following combustion and expansion, the exhaust valve 321 opens port 319, permitting gases to pass outwardly through the passage 332 to the exhaust port. Because of the connection of passage 322 with the peripheral part of the combustion chamber, the exhaust gases are preferentially selected from the peripheral combustion chamber portion which is lowest in residual quench hydrocarbons and $NO_x$. Thus, upon closing of the exhaust valve, the residual cylinder gases include those portions of the exhaust gases from the rich core portion of the combustion which were richest in hydrocarbons and $NO_x$. These are retained for combustion on the following cycle.

It should be understood that the absolute mixture strengths of the air-fuel mixtures in the richer and leaner portions of the charge may be varied considerably. Thus, the richness of mixture supplied to the central core portion of the combustion chamber may vary from substantially richer than a stoichiometric (chemically correct) mixture to somewhat leaner than a stoichoimetric mixture. The mixture in the peripheral portions of the chamber will of course be leaner than that in the core portions and may vary from pure air to a mixture strength leaner than but approaching stoichiometric.

While the invention has been described by reference to a number of differing embodiments having certain common characteristics, it should be understood that numerous other changes could be made within the scope of the inventive concepts described and it is intended that the invention not be limited, except by the language of the following claims.

What is claimed is:

1. The combination in a spark ignition internal combustion engine of
   means defining a closed end cylinder having walls and a central axis,
   a piston reciprocable in said cylinder and cooperating with the cylinder closed end to define therebetween a variable volume combustion chamber free from connecting auxiliary ignition chambers,
   means for forming in the combustion chamber a stratified charge of air-fuel mixture directed in a swirling pattern around the cylinder axis and having a core portion moving in a central zone of the combustion chamber surrounding the axis and an outer peripheral portion moving angularly along an outer edge portion of the combustion chamber outside the central zone and relatively more distant from the axis, said core portion of the charge being substantially richer in fuel than said outer peripheral portion, said charge forming means including a valve controlled inlet port connecting with the combustion chamber,
   spark ignition means including a spark gap in the combustion chamber and extending into the central zone for igniting the richer mixture in the core portion of the charge, and
   a valve controlled exhaust port for carrying combustion products from the combustion chamber, said exhaust port being spaced from the combustion chamber and connected exclusively with the outer edge thereof by a passage that opens through the combustion chamber walls distant from the central zone and is thereby adapted to preferentially receive for discharge, combustion products from the outer peripheral portion of the burned charge in which the residual concentration of unburned hydrocarbons is initially lower than in the core portion of the burned charge.

2. The combination of claim 1 wherein said inlet port opens through said cylinder closed end in a space substantially to one side of the cylinder axis and said stratified charge forming means further comprises a divider wall extending longitudinally within said inlet port and dividing said port into first and second flow passages and a flow directing vane formed on said cylinder closed end and extending into the combustion chamber, said flow directing vane extending arcuately around said axis, spaced from the walls distant from the axis, and being generally aligned with the end of said port divider wall, said first inlet port flow passage being adapted for connection with a source of relatively rich air-fuel mixture and opening into the central zone of the combustion chamber within said flow directing vane and said second inlet port flow passage being adapted for connection with a source of air and opening to the outer edge of said combustion chamber outwardly of said flow directing vane, said first and second flow passages being directed to introduce fluids therefrom into said combustion chamber in a relatively nonturbulent swirling pattern around said central axis with the richer mixture charge admitted by said first flow passage being substantially segregated by the flow directing vane in the central zone of the combustion chamber.

3. The combination of claim 2 wherein said stratified charge forming means further includes a poppet inlet valve arranged to close said inlet port and openable to permit fluid flow from said port to said combustion chamber, said inlet valve including shroud means extending into said inlet port and arranged to direct the flow of inlet fluids into the chamber in the direction of swirl initiated by said inlet port.

4. The combination of claim 1 wherein said inlet port is substantially centered on the cylinder axis and opens into said central zone of the combustion chamber, said zone being segregated from the outer edge portion by an annular vane extending around the cylinder axis, said stratified charge forming means further comprising a second valve controlled inlet port opening to the outer edge portion of the combustion chamber outwardly of said vane.

5. The combination of claim 4 wherein said second inlet port is arranged to direct incoming fluid flow in a swirling direction within the outer edge portion of said combustion chamber and means are provided within the centrally disposed inlet port to direct its incoming fluids in a swirling direction within the central zone of said combustion chamber, the directions of swirl in said central zone and said outer edge portion being the same.

6. The combination of claim 1 wherein said inlet port is centered on said cylinder axis and means are provided in said port for directing incoming air in a swirling direction around said combustion chamber, said stratified charge forming means further comprising means for injecting fuel directly into the combustion chamber central zone at a point near the inlet port and spaced inwardly from the combustion chamber outer edge portion, said spark ignition means being disposed in the combustion chamber central zone near the fuel injection means but spaced circumferentially therefrom in the direction of chamber air swirl.

7. The combination of claim 1 wherein the passage connecting said exhaust port with the combustion chamber opens to the combustion chamber through the outer edge thereof and extends from the outer wall of the combustion chamber generally tangentially in the direction of fluid swirl within the combustion chamber.

8. The combination of claim 1 wherein said inlet port is also connected with the combustion chamber by the said passage that connects the exhaust port with the combustion chamber, said passage connecting exclusively with and being angled with respect to the outer edge portion of the combustion chamber so as to generate said swirling pattern in fluids admitted to the combustion chamber through said passage.

9. The combination of claim 8 wherein said stratified charge forming means further comprises fuel injection means in the combustion chamber central zone at a location radially inwardly of the outer edge portion and its connection with said passage, said spark ignition means also being disposed in the central zone near the fuel injection means and circumferentially spaced therefrom in the direction of swirl of the combustion chamber fluids.

* * * * *

UNITED STATES PATENT AND TRADEMARK OFFICE
CERTIFICATE OF CORRECTION

PATENT NO. : 4,119,064
DATED : October 10, 1978
INVENTOR(S) : Edward D. Klomp

It is certified that error appears in the above—identified patent and that said Letters Patent are hereby corrected as shown below:

Column 1, line 2, "startified" should read --stratified--.

Column 1, line 42, "lead" should read --lean--.

Column 3, line 66, "vertical" should read --vortical--.

Column 4, line 36, "goes" should read --gases--.

Column 4, line 37, "passges" should read --passages--.

Signed and Sealed this

Sixth Day of March 1979

[SEAL]

Attest:

RUTH C. MASON
Attesting Officer

DONALD W. BANNER
Commissioner of Patents and Trademarks